No. 786,315.

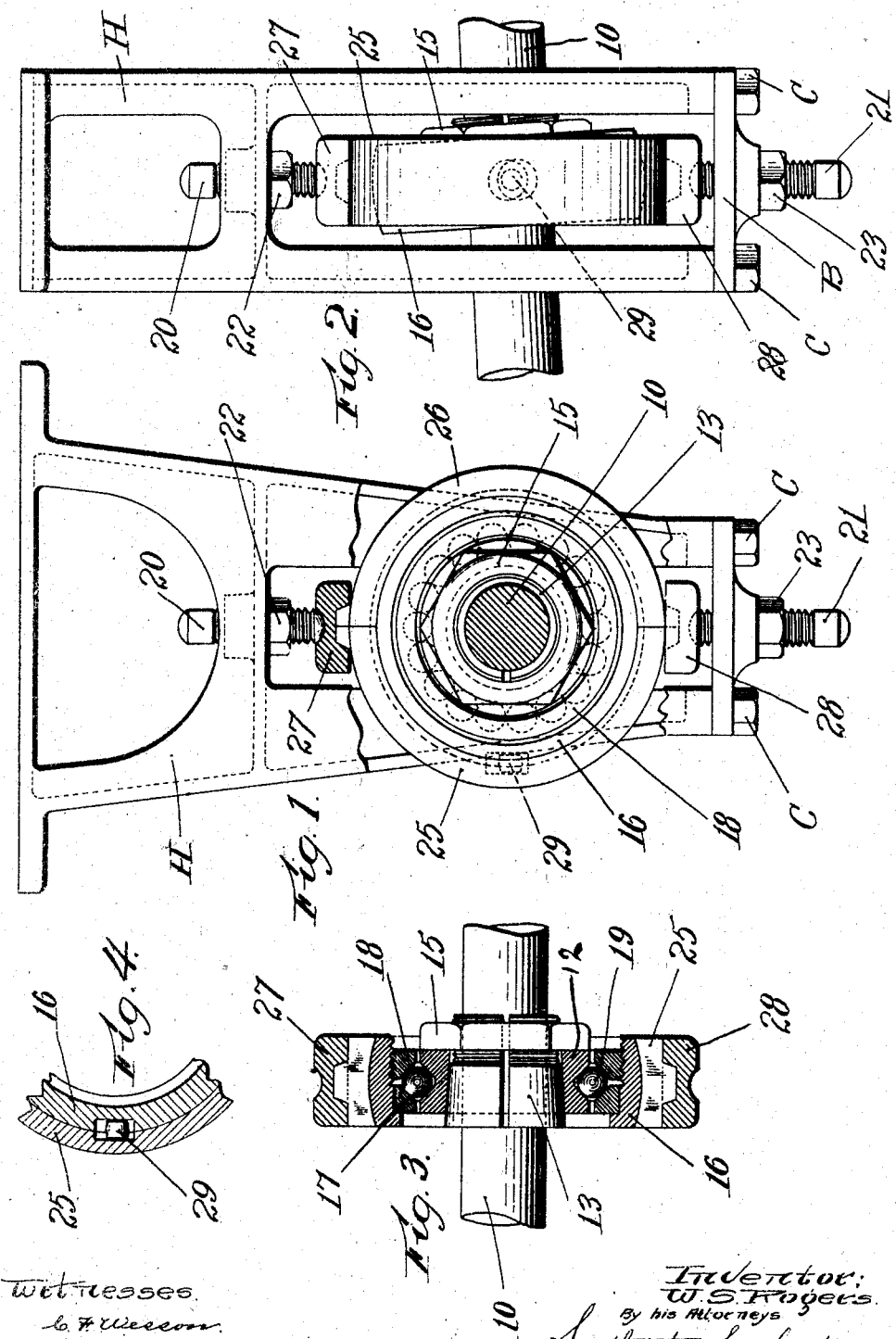

Patented April 4, 1905.

UNITED STATES PATENT OFFICE.

WINFIELD S. ROGERS, OF BANTAM, CONNECTICUT, ASSIGNOR TO JOHN L. BUELL, OF LITCHFIELD, CONNECTICUT.

BALL-BEARING HANGER.

SPECIFICATION forming part of Letters Patent No. 786,315, dated April 4, 1905.

Application filed August 17, 1903. Serial No. 169,675.

*To all whom it may concern:*

Be it known that I, WINFIELD S. ROGERS, a citizen of the United States, residing at Bantam, in the county of Litchfield and State of Connecticut, have invented a new and useful Ball-Bearing Hanger, of which the following is a specification.

This invention relates to the boxes or bearings for shaft-hangers or for similar purposes.
The especial object of this invention is to provide means for supporting a bearing-box so that it may be turned or tipped to adapt itself to crooked shafting.

To this end this invention consists of the construction and combinations of parts, as hereinafter described, and more particularly pointed out in the claims at the end of this specification.

In the accompanying drawings, Figure 1 is an end view, partially broken away, illustrating a shaft-hanger in which the bearing-box is supported so as to be capable of universal motion. Fig. 2 is a side view of the construction shown in Fig. 1. Fig. 3 is a sectional view thereof, and Fig. 4 is a detail view showing the manner in which certain of the parts are keyed together.

In ordinary shaft-hangers employed for the line of shafting used in mills and shops for driving machinery ordinary bearing-boxes are now used, which require frequent lubrication.

The use of lubricating-oil, especially on overhead shafting, is objectionable on account of the dropping of oil therefrom. To overcome this objection, it has been proposed in a number of instances to employ ball or roller bearings or other antifriction-bearings, which will require little, if any, lubrication. The successful use of ball or roller bearings requires the accurate adjustment of parts so that the bearing-balls will run without grinding.

In installing long lines of shafting it is difficult and oftentimes impossible to secure shafting which is absolutely straight.

The especial object of my present invention is to provide a shaft-hanger construction in which the ball-bearings are so mounted that they will be free to be tipped or turned in any direction to compensate for crooked shafting.

As shown in Fig. 3, 10 designates the shaft which is to be supported in a hanger constructed according to this invention. Mounted on the shaft 10 is a split bushing of tapering form, the smaller end of which is threaded. Fitting onto the tapering bushing is the ball track or way 12, these parts being fastened together by a nut 15. By means of this construction the ball track or way is securely fastened upon the shaft 10 without cutting or marring the same. Running in the ball track or way are the bearing balls or rollers 19, which are held in place by rings 17 and 18. The ring 17 is fastened rigidly in a bearing box or sleeve 16, and the ring 18 is adjustably threaded therein, so that the same may be set up to tighten the bearing and to take up wear when required. The bearing box or sleeve 16 is mounted in the hanger so that it will be free to tip or tilt to adapt itself to crooked shafting. To accomplish this purpose, the bearing-box 16 is of spherical form. Fitting onto and supporting the bearing box or sleeve are ring-sections 25 and 26. Extending from the ring-sections 25 and 26 are trunnions, one-half of each trunnion extending from each ring-section. These divided trunnions are fitted into and are fastened together by step-pieces 27 and 28, the step-pieces 27 and 28 being held in place by pivot-screws 20 and 21. In order to limit the extent of the wabbling or tipping of the bearing box or sleeve 16, I provide a loose key for holding the parts in position. One form of this construction is illustrated in Fig. 4. As shown in this figure, the bearing-box 16 and one of the ring-sections are provided with sockets or recesses, fitting loosely into which is a small roller or loose key 29. The small roller 29 is preferably about one-half the diameter of the recess in the bearing-box 16 and the corresponding recess in the ring-section 25. This will permit the bearing-box to be turned or tipped to a limited extent only in any direction. The roller 29 is preferably unattached to either the bearing-box 16 or the ring-section 25, although, if desired, the key for limiting the relative movement of these parts may be formed by a gudgeon or pin which is rigid with one part and fits loosely into a recess in the other part.

In this application for patent I do not desire to claim specifically the split tapering bushing which I have shown as the means for fastening the ball-track to the shaft, as this is regarded as a separate subject-matter of invention.

I am aware that numerous changes may be made in practicing this invention by those who are skilled in the art without departing from the scope thereof as expressed in the claims. I do not desire, therefore, to be limited to the construction I have herein shown and described; but What I do claim, and desire to secure by Letters Patent of the United States, is—

1. In a construction of the class described, the combination of a hanger, a bearing-box having a spherical surface, two half-ring sections forming a socket receiving the bearing-box, two clamping-pieces for holding the half-ring sections together, and two center screws, each one of which engages and provides a pivotal support for one of the clamping-pieces.

2. In a construction of the class described, the combination of a bearing-box, having a spherical surface, two half-ring sections inclosing the bearing-box, said ring-sections having projections at their meeting ends, each of which forms one-half of a trunnion, step-pieces engaging the trunnions and clamping the half-ring sections together, pivot-screws holding the step-pieces in place, and locking-nuts holding the pivot-screws in adjusted positions.

3. In a construction of the class described, the combination of a bearing-box, having a spherical surface, two half-ring sections inclosing the bearing-box, the meeting ends of the half-rings having projections, each of which forms one-half of a trunnion, step-pieces engaging the trunnions and means for supporting the step-pieces to hold the parts together, and a roller extending into sockets in the meeting faces of the bearing box or sleeve and one of the ring-sections to limit the relative motion of these parts.

In testimony whereof I have hereunto set my hand in the presence of two subscribing witnesses.

WINFIELD S. ROGERS.

Witnesses:
   EDWARD J. MARTIN,
   DAVID G. HASKELL.